(12) United States Patent
Atherton et al.

(10) Patent No.: US 10,303,393 B2
(45) Date of Patent: May 28, 2019

(54) TECHNOLOGY FOR GOVERNANCE OF DATA RETENTION AND TRANSFER

(71) Applicant: International Business Machines Corporation, Armonk, NY (US)

(72) Inventors: Kimberly L. Atherton, Trumbull, CT (US); David N. Carley, Dublin, OH (US); Andrew J. Stimer, Westerville, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 364 days.

(21) Appl. No.: 15/187,804

(22) Filed: Jun. 21, 2016

(65) Prior Publication Data
US 2017/0364302 A1  Dec. 21, 2017

(51) Int. Cl.
*G06F 17/30* (2006.01)
*G06F 3/06* (2006.01)

(52) U.S. Cl.
CPC .......... *G06F 3/0649* (2013.01); *G06F 3/0604* (2013.01); *G06F 3/067* (2013.01)

(58) Field of Classification Search
CPC ....... G06F 3/0649; G06F 3/067; G06F 3/0604
See application file for complete search history.

(56) References Cited

U.S. PATENT DOCUMENTS

| 6,557,039 | B1 | 4/2003 | Leong | |
| 7,249,251 | B2* | 7/2007 | Todd | G06F 12/0261 |
| | | | | 707/E17.01 |
| 7,962,708 | B2 | 6/2011 | Kilday | |
| 8,028,135 | B1* | 9/2011 | Manley | G06F 11/1448 |
| | | | | 711/161 |
| 8,234,477 | B2 | 7/2012 | Shaath | |
| 8,583,881 | B1 | 11/2013 | Stuart | |
| 8,620,869 | B2* | 12/2013 | Consul | H04L 51/22 |
| | | | | 707/662 |
| 9,424,432 | B2* | 8/2016 | Holland | G06F 21/60 |
| 9,633,216 | B2* | 4/2017 | Gokhale | G06F 21/6218 |
| 2005/0108435 | A1* | 5/2005 | Nowacki | G06Q 10/107 |
| | | | | 709/246 |
| 2005/0125411 | A1* | 6/2005 | Kilian | G06F 17/30551 |
| 2005/0177591 | A1* | 8/2005 | Kanda | G06F 17/30067 |

(Continued)

FOREIGN PATENT DOCUMENTS

EP  2564310 A1  11/2011

*Primary Examiner* — Albert M Phillips, III
(74) *Attorney, Agent, or Firm* — Anthony V. S. England; Reza Sarbakhsh

(57) ABSTRACT

For storing data in computer readable storage devices, a policy table is provided that is configured to define respective retention period policies for respective items of the data according to geolocation origins of the respective items of the data. First data is received from a first computer system and is stored by a computer system hosting a first computer readable storage device. A first data entry is generated in an audit table. This includes generating a timestamp indicating when the first data was received and the geolocation of the first computer system from which the first data is received. A retention period is assigned for the first data according to a retention period indicated in the policy table for the geolocation origin in the first data entry.

15 Claims, 4 Drawing Sheets

(56) References Cited

U.S. PATENT DOCUMENTS

| | | | |
|---|---|---|---|
| 2006/0156382 A1* | 7/2006 | Motoyama | G06F 21/6209 726/1 |
| 2012/0331284 A1 | 12/2012 | Kouladjie | |
| 2013/0024429 A1* | 1/2013 | Raas | G06Q 10/10 707/689 |
| 2013/0275391 A1* | 10/2013 | Batwara | G06F 17/30085 707/689 |
| 2014/0188804 A1* | 7/2014 | Gokhale | G06F 21/6218 707/645 |
| 2017/0201433 A1* | 7/2017 | Malatesha | H04L 43/045 |

* cited by examiner

TECHNOLOGY FOR GOVERNANCE OF DATA RETENTION AND TRANSFER

FIELD OF THE INVENTION

The field of the present invention concerns storing data in computer readable storage devices and controlling the deletion and transfer of data in the storage devices based on geolocations.

BACKGROUND

Data lifecycle management technology, also known as information lifecycle governance (ILG) technology, provides ways to control data stored in computer readable storage.

SUMMARY

A method for storing data in a computer readable storage device includes providing a computer readable policy table configured to define respective retention period policies for respective items of the data according to geolocation origins of the respective items of the data. First data is received from a first computer system via a network and is stored by a computer system on a first computer readable storage device. A first data entry is generated in an audit table by an information lifecycle governance ("ILG") process executing on the host computer system including a timestamp indicating when the first data was received and the geolocation of the first computer system from which the first data is received. A current age of the first data is determined based on the timestamp of the first data entry. The ILG process assigns an applicable retention period for the first data according to a retention period indicated in the policy table for the geolocation origin in the first data entry. The ILG process deletes the first data from the first computer readable storage device responsive to the current age of the first data exceeding the applicable retention period assigned to the first data.

System and computer program products relating to the above-summarized method are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
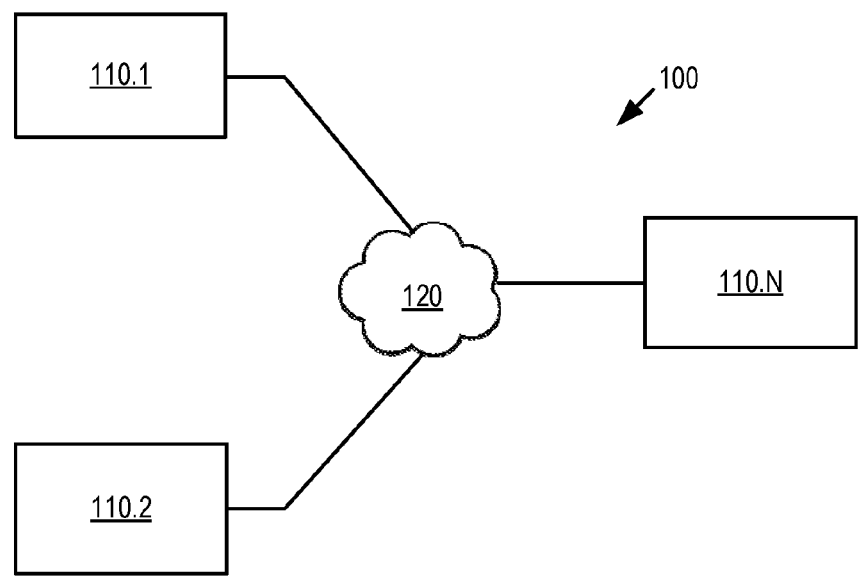
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be public or private. Systems 110.1, 110.2, etc. include modules, which may be program or hardware modules, configured to perform tasks for their own respective systems or for other systems or both.

Figure 2:
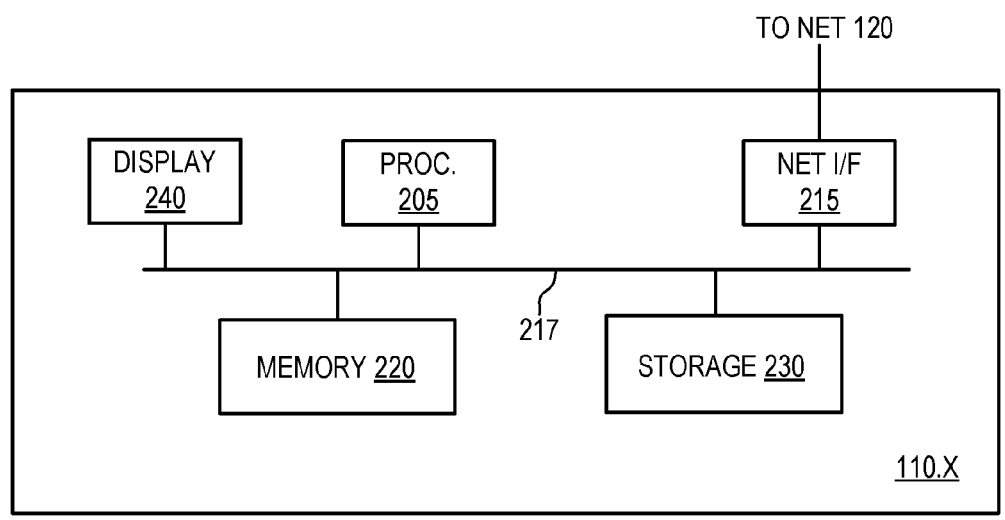
FIG. 2 is a block diagram of devices shown in FIG. 1, according to embodiments of the present invention.

FIG. 2 illustrates details of a computer system 110.X suitable as computer systems 110.1, 110.2, etc. according to embodiments of the present invention, wherein system 110.X includes at least one central processing unit (CPU) 205, network interface 215, interconnect (i.e., bus) 217, memory 220, storage device 230 and display 240 where system 110.X may include an icon management module 260. CPU 205 may retrieve and execute programming instructions stored in memory 220 for applications, including module 260. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, such as model builder 103, according to embodiments of the present invention. It should be understood that system 110.X may be implemented by other hardware and that one or more modules thereof may be firmware.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

ILG technology described herein provides ways to assign retention periods for data stored in computer readable media. In one or more implementations, data includes records, tables, data blocks, files and repositories, for example. These examples are not meant to be limiting. The data may be structured in other ways. The data may include text, images, video and audio, for example. In one or more implementations, the data may be printed matter, i.e., not stored in computer readable media. However, access to the data and retention of the data is controlled by a computer implemented ILG process according to computer data structures, such as audit and policy tables described herein below.

Storage retention periods are assigned 605 to the data, such as by using timestamps on respective computer readable data marked in respective computer readable data storage locations, for example. A time stamp may mark a timeframe for which its associated data is retained by a file system. For example, when the retention period expires, an ILG process of a computer system may automatically mark the data for deletion. Once data is marked for deletion, the ILG process typically deletes the data automatically, i.e., without human intervention, although deletion may sometimes be placed on hold for some reason, in which case the ILG process may eventually delete the data responsive to human intervention.

Embodiments of the present invention provide geolocation-specific aspects for ILG technology. In this context, a "geolocation" refers to a geographic location. A "jurisdiction" refers to one or more entities that govern a geolocation, e.g., governmental entity, business entity, etc. Respective geolocations may be subject to different jurisdictions, wherein different jurisdictions may impose different legal or business requirements for data retention. Indeed, a single geolocation is usually subject to more than one jurisdiction, such as that of a state entity, a federal entity and a business entity, for example.

Geolocation-specific aspects for ILG technology disclosed herein provide ways to retain and limit transfer of each respective item of data responsive to legal and business requirements of jurisdictions associated with the respective item, which takes into account not only that legal and business requirements of a geolocation associated with an item of data may be subject to change according to changing laws, regulations and business practices for a jurisdiction that governs the geolocation, but also that geolocations associated with an item may change over time.

Figure 3:
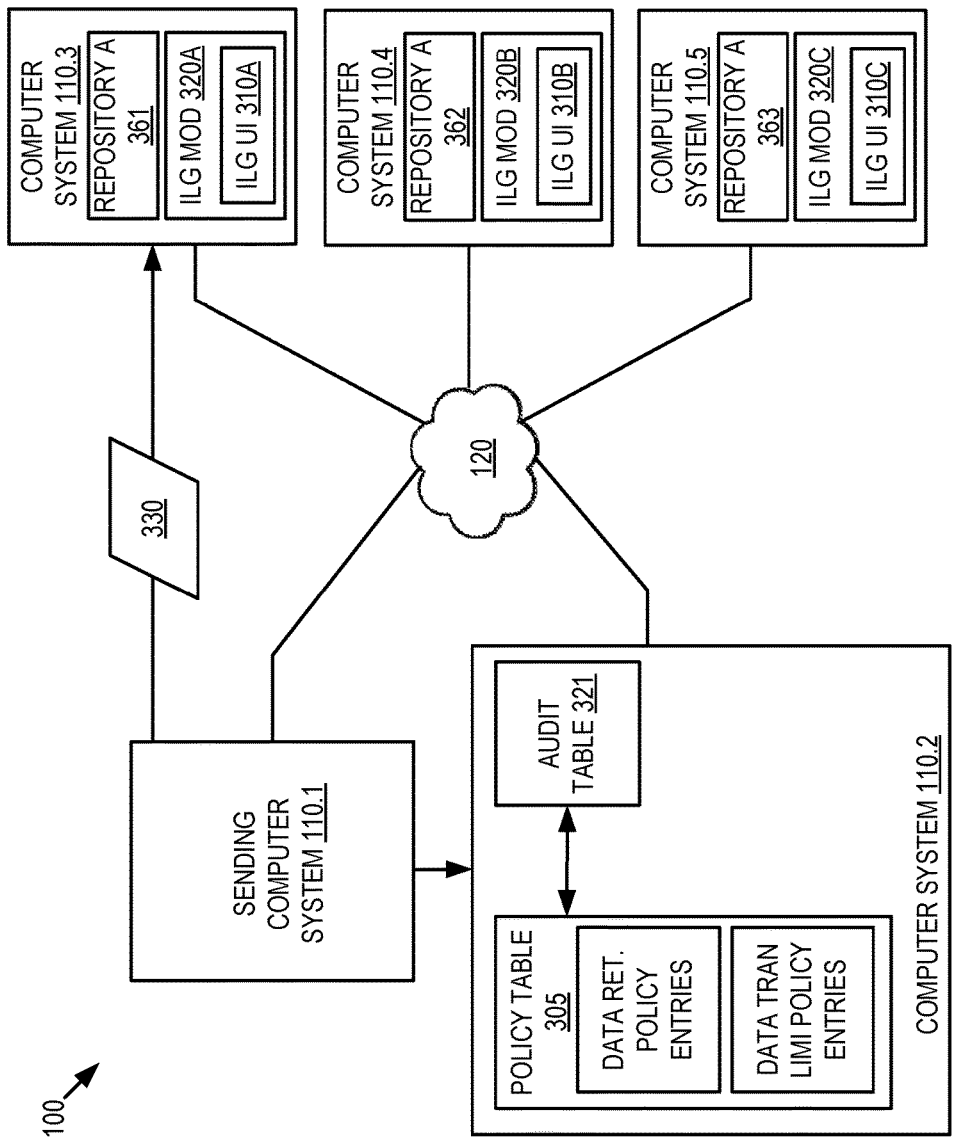
FIG. 3 illustrates additional aspects of computing environment for governing data retention and transfer, according to embodiments of the present invention.

Referring to FIG. 3, additional aspects of computing environment 100 for governing data retention and transfer are illustrated along with a data transfer, according to embodiments of the present invention A datacenter "A" computer system 110.3 is in geolocation "A," such as, for example, Alexandria, Va., and provides a repository 361 (also referred to as repository A) for storing data and includes an ILG module 320A having an executable data structure for an executing ILG process 321A. ILG module 320A includes a user interface module 310A for receiving input from a user and responsively writing and storing entries in a policy table 305, where the entries define data retention periods and data transfer limitations based on jurisdictions or other business/legal requirements. The entries may be based on associated geolocation(s) of data, e.g., geolocation(s) in which the data storage resides or to which the data applies. Geolocation(s) to which the data may be transferred, i.e., exported, may also be based on geolocation(s) in which the data has previously resided or to which the data previously applied. Policy table 305 is shared among datacenter A computer system 110.3, a datacenter B computer system 110.4 (which is in geolocation B, such as, for example, San Jose, Calif., and provides repository 362, also referred to as repository B, and has its own ILG process 320B with user interface 310B) and a datacenter C computer system 110.5 (which is in geolocation C, such as, for example, Frankfurt, Germany, and provides repository 363, also referred to as repository C, and has its own ILG process 320C with user interface 310C). In the illustrated instance, policy table 305 is located in computer system 110.2, which is remote from datacenters A, B and C, although it could be located in one of the datacenter computer systems 110.3 through 110.5.

Figure 4:
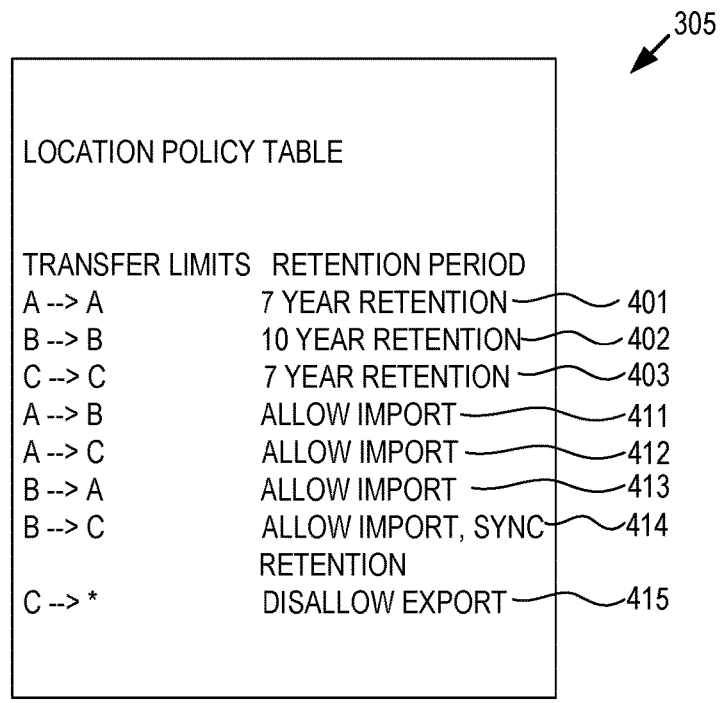
FIG. 4 illustrates a policy table and repositories, according to embodiments of the present invention.
Figure 4:
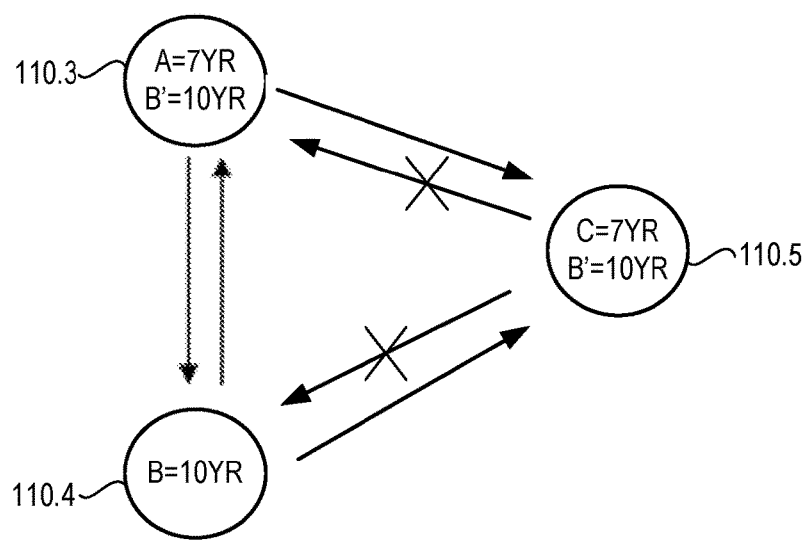

Referring now to FIG. 4, a policy table 305 for repositories A, B and C is illustrated in more detail, wherein policies specified in policy table 305 are based on geolocations of the repositories. Table 305 includes data retention policy entries and data transfer limitation policy entries for each of repositories A, B and C. One data retention entry 401 specifies a seven-year retention for data stored in repository A, another data retention entry 402 specifies a ten-year retention for data in repository B, and a third data retention entry 403 specifies a seven-year retention for data in repository C. One data transfer limitation policy entry 411 specifies that data may be transferred from repository A to repository B. Another data transfer limitation policy entry 412 specifies that data may be transferred from repository A to repository C. Another data transfer limitation policy entry 413 specifies that data may be transferred from repository B to repository A. Another data transfer limitation policy entry 414 specifies that data may be transferred from repository B to repository C. Another data transfer limitation policy entry 415 specifies that data may NOT be transferred from repository C to any other repository.

Referring again to FIG. 3, an ILG process arising from an ILG module, such as module 320A in the illustrated instance, provides intelligent audit trails of stored data, which are different than audit trails previously provided. Previously, an audit trail for archived data has been manually constructed based on records for a repository where the data is archived. That is, records for a repository have previously been stored locally on the server that hosts the repository and the records have been limited to indicating only the events of creating, accessing and modifying files and folders of the server, the date when each such event occurred and the date when the retention period expires for each data item. Thus, to construct an audit trail for a particular set of archived data has previously required a manual process of discovery to tie the particular set of archived data to the change history indicated by the records of creating, accessing and modifying files and folders of the server on which the data was archived. Further, the records that have been stored for these events did not previously include sufficient information to enable desirable lifecycle governance features described herein, and the events themselves that were defined to trigger the writing of records were insufficient. Features are disclosed herein in addition to marking retention expiration dates for data upon initial archiving. Processes and structures defined herein provide for automatic updating of retention periods across various jurisdictions responsive to detecting certain events, which enables consistency and prevents incorrect removal of data from retention.

A data item, such as file 330 from a user's computer 110.1, as shown, may be archived into a repository, such as repository 361 in datacenter A computer 110.3, as shown, by an ILG process of an ILG module, such as module 320A in the illustrated instance, responsive to receiving a command from the user signaling the ILG process to archive the data item, which may be a simple drag and drop operation, for example, and may be via a user interface ("UI"), such as UI 310A. Also, the data item may be archived into a repository automatically by an ILG process of a computer system, such as responsive to updates from a related data transfer (such as from one geolocation to another) or updates to the retention policy According to aspects of embodiments of the present invention, an ILG process of a computer system initially assigns governance parameters for a data item when the data item is archived, wherein the parameters include a retention period and transfer limitation(s). The ILG process may assign the parameters responsive to receiving them directly from a user via the ILG user interface or may assign them responsive to one or more categories associated with the data item, such as data significance, geolocation(s) and jurisdiction(s). The parameters are predefined for the one or more categories and are accessible in a computer readable storage location, such as the policy table, so that the ILG process may look up the parameters based on the one or more categories.

The categories and parameters may correspond with business and legal rules related to managing the data for compliance within the jurisdiction. Upon occurrence of an event relating to a legal matter, for example, the ILG process may change retention for a set of data matching certain criteria, such as all emails from "*@domain.com."

In addition to assigning initial governance parameters defining retention and transfer limitations upon initiation of archiving, which the ILG process does by recording one or more entries in an audit table 306 for the data, the ILG process also records the initial data categories associated with the particular data item, including data significance, geolocation(s), jurisdiction(s), etc., as one or more initial entries in audit table 306 for the data. The initial data categories of jurisdication(s) and geolocation(s) initially govern retention of the data as of the time when the data is archived and typically relate to a country, state, business entity, etc. that the data describes, from which the data is uploaded or where the data is stored.

The categories for a particular data item, e.g., significance, geolocation(s), jurisdiction(s), etc., may be received by the ILG process via input from an ILG interface, for example, by a user when the user initiates archiving of the particular data. Alternatively, the ILG process may automatically determine the data categories for the particular data when the ILG receives user input initiating archiving of the particular data, wherein the ILG process determines the data categories by analysis of the particular data, itself, network parameters associated with the source of the data, i.e., computer readable storage media location, and network parameters associated with transfer of the data to the archive destination.

The ILG process may automatically determine the data categories for the particular data responsive to one or more predetermined confidence level rules set by an administrator. An administrator may set a confidence level rule or rules via input to the ILG user interface 310, responsive to which ILG process of module 320 may create a configuration file, for example. Alternatively, the user may directly author a configuration file.

Confidence level rules define the level of certainty required to determine that data originated from a particular geolocation. For example, in one or more embodiments of the present invention a confidence level rule indicates that data created within a datacenter would have 100% confidence of the origination point within the datacenter. (Computer system 110.2 may be located in datacenter A along with the repository A host computer 110.3, for example.) Information gathered by ILG process for a data creation or data transfer operation indicates origin of the data, e.g., file 330 in the illustrated instance. The geolocation and network IP address information correspond to physical locations for the related network infrastructure. Exact geolocations are known for datacenters. Responsive to initiating the creation, deletion, transfer or change of data, the ILG process of a datacenter maintains entries in audit table 306 for respective items of data stored in the datacenter. The latest entry in audit table 306 for a respective data item indicates the datacenter where the data item is stored. Consequently, when data is stored in a datacenter, the exact geolocation of the data is identifiable by reference to the latest entry for the data in audit table 306. Consequently, if data is created within a datacenter, reference to audit table 306 for the data indicates with certainty that the geolocation of the datacenter is the geolocation from which the data arose.

Further, in one or more embodiments of the present invention a confidence level rule indicates that transfer from a secure location (e.g. business location) to a datacenter would also provide sufficient confidence of the origination point. That is, if an ILG process determines data is uploaded from a secure location to a datacenter, then it is certain enough that the geolocation of the secure location is the geolocation from which the data was uploaded. Secure locations are indicated by data transfer connections. Examples of secure locations include a datacenter, a physical office with dedicated LAN, a physical office using VPN, and a public Internet using VPN. Examples of unsecure locations include public Internet. ILG process 320 may determine the IP address of the location from which data is uploaded using operating system commands such as "ping" and "whois."

Internet protocol ("IP") addresses correspond to network topologies that can be correlated to the location of network infrastructure. When data is sent to a datacenter, which can be determined by its destination IP address, an ILG process collects the source IP address associated with the computer system that sent the data. Geolocation software methods exist for determining the location based on an IP address.

Furthermore, companies with assigned IP addresses can be tracked through their allocation at particular networks for particular use.

As indicated by the example of dedicated LAN, VPN, etc. above, an ILG process may take into account the nature of a connection for determining geolocation of data origin. Likewise, the ILG process may take into account authenticated versus non-authenticated users associated with the origin of data, according to one are more embodiments of the present invention. A user external to a datacenter who does not have identifiable information other than network connection is not an authenticated user. Authenticated users include users with predetermined login credentials recognized by an ILG process. Thus, according to one or more embodiments of the present invention, a confidence level rule may specify that the geolocation from which data originates is sufficiently certain for applying an ILG policy when the circumstance satisfies one of a plurality of conditions, but not otherwise, where, for example, the conditions are that the data has i) a secure datacenter origin, ii) a secure LAN connection and is from an authenticated user, and iii) the data has a secure VPN connection and is from an authenticated user. Alternatively, the confidence level rule may not require an authenticated user in the above conditions.

An ILG process applies an origin-based retention and transfer policy only for data having an origin that can be determined with sufficient certainty to satisfy confidence level rules. According to various embodiments of the present invention, there may be several categories of data originators that are recognizable for establishing geolocations. An ILG process may be configured to recognize a geolocation of data origin based on, for example, a data transfer from a datacenter that meets certain compliance standards, a corporate network, a corporate VPN and an authenticated user.

While a corporate network, corporate VPN may exist in more than one geolocation, and while a user may travel from one geolocation to another, in one or more embodiments of the present invention, an ILG process may be configured to assign a single geolocation to data originating from the corporate network, corporate VPN, authenticated user, etc. In one or more embodiments of the present invention, ILG process 320 may be configured to assign different geolocations to data originating from different geolocations of the corporate network, corporate VPN, authenticated user, etc.

Once data has been stored within a secure datacenter and the geolocation of the origin of the data has been established, then an ILG process controls retention and transfer based on legal and business rules that apply for that geolocation of origin. Otherwise, for data having an origin that cannot be sufficiently determined, such as data from an anonymous user or that is otherwise unknown, the ILG process applies a policy for anonymous data.

The following are concrete geolocation examples:
A=US, Virginia, Datacenter (compliance: HIPAA, SSAE16, ISO)
B=US, California, Datacenter (compliance: SSAE16, ISO)
C=Germany, Datacenter (compliance: SSAE16, ISO, EU)
D=US Corporate network
E=US Corporate VPN
F=US Authenticated user
G=US Anonymous user
H=Unknown
F=Germany According to one or more embodiments of the present invention, an ILG process may also automatically determine geolocation(s) described by the data, jurisdiction(s) that govern the data and significance of the data at least partly by analyzing the data itself and may also include other input for the determination, including reason for archiving and other information input by the user.

Geographical origin of data is identifiable for the first instance of the data and for a copy/modification of existing data. In order to determine data origin, an ILG process determines if the data was ever outside of datacenter control, including from the original creation of the data and through transfers/modifications. The machine IP or other attributes associated with data can identify the origin of data, including but not limited to attributes such as user access logs. The data may indicate that it describes a particular geolocation due to the data including a name of the geolocation or an address within the geolocation, especially when the name or address is in a recognizable context. In the example of a datacenter, the level of compliance for the secured physical location provides the exact geolocation. That is, datacenters are controlled such that exact geolocations are known for datacenters. Consequently, when data is stored in a datacenter, the exact geolocation of the data is identifiable by its association with the datacenter. In examples of machines outside of secured datacenters, the IP address and other locating information (e.g. document origin, user origin) associated with the data are used by ILG process 320 for identifying the source of data and the corresponding retention rules. Other locating information can include any additional identifiable information for the user. This may include, but is not limited to, operating system, browser, plugins, etc. These attributes may be extracted through fingerprinting techniques. The ILG process may automatically determine a source geolocation from which the data is uploaded by a user or machine using data attributes as defined in the previous examples. The data may indicate that it is governed by a particular jurisdiction due to the data including one or more references to the jurisdiction or particular statutes or rules that the jurisdiction applies, especially when such a reference is in a recognizable context. The context for the retention in some cases may be directly linked to the type of data (e.g. healthcare data must comply with HIPAA regulations within the US and all usage must satisfy HIPAA compliance regulations). The data may indicate that it has a particular significance due to the data including all related retention requirements from a legal standpoint (e.g. legal matters and audit retention of required data) and additional business need for retention (e.g. data desired to be stored, however can be deleted without legal consequence).

To provide intelligent audit trails of archived data stored in a repository, according to embodiments of the present invention, the ILG process not only writes an entry in a data's audit table that records initial archiving, i.e., upload of the data to the archive (i.e., repository), but also writes entries that record downloads of the data and transfers of the data from one repository to another, including identity of each jurisdiction and geolocation to which the data is downloaded or transferred and when each such download or transfer of the data occurred.

According to one change policy of one or more embodiments of the present invention, the ILG process maintains the same retention periods for data in storage based on storage geolocation(s), e.g., geolocations where the data is stored, such that responsive to detecting that a storage location for the data changes from a first geolocation to a second geolocation (or that the data is added to the second geolocation), for example, the ILG process maintains the same retention period for the data stored in the second geolocation as whatever retention period applied for the first geolocation.

More generally, a user may record a change policy entry in policy table 305 for particular data that indicates the effect that a change in location of the data has on retention of the data. According to embodiments of the present invention, the user may enter a "change," "maintain," or "maximum" change policy, for example. According to the "change" policy, the ILG process changes retention periods for data in storage based on storage geolocation(s), such that responsive to detecting that a storage location for the data changes from a first geolocation to a second geolocation (or that the data is added to the second geolocation), for example, the ILG process changes the retention period for the data from the retention period for the first geolocation to whatever retention period applies for data stored in the second geolocation. According to the "maximum" policy, the ILG process assigns the longest retention periods for data in storage based on storage geolocation(s), such that responsive to detecting that a storage location for the data changes from a first geolocation to a second geolocation (or that the data is added to the second geolocation), for example, the ILG process assigns the retention period for the data according to the longest of the retention period for the first geolocation and the retention period that ordinarily applies for data stored in the second geolocation.

Likewise, when data is accessed from a different location, the ILG process may change retention periods, maintain the same ones, or maximize retention periods depending on an access location change policy in policy table 305 for the data. Correspondingly, responsive to detecting a change in a geolocation from which the data is accessed, e.g., detecting that in addition to accessing the data from a first geolocation the data has also been accessed by a second geolocation, for example, the ILG process also records the second geolocation's retention period for the data in the data's audit table 306, i.e., in addition to the first geolocation's retention period. Then, the ILG process retains, extends or removes the data, depending on the applicable policy.

The updated retention policy propagates backwards to update all servers where the data and copies of the data sit. That is, the ILG process updates audit table 306 for each corresponding copy of the data at each geolocation responsive to a retention change. In certain embodiments of the present invention, The ILG process sets the retention periods to the longest retention period of all policies applicable to the data. In the case that a policy change prohibits data from being retained or transferred in certain geolocations, the ILG process updates the data retention accordingly in each audit table, to restrict the transfer and further usage of the data from the identified locations. ILG technology disclosed herein, according to embodiments of the present invention, allow for retention periods to be updated dynamically responsive to changing retention policies of governing jurisdictions. Consequently, when governance of a document or other data item is moved from one jurisdiction to another, the ILG technology automatically updates the retention period for the document or other data item to meet retention requirements of the changed jurisdiction, and flags the move as a potential violation of the previous jurisdiction.

Moves from one jurisdiction to another may include, for example, moving data from a data center located in Germany to a data center located in USA, moving data by a user located in the USA using public Internet to a data center located in the USA, and moving data by a user located in the USA using public Internet via VPN to a data center located in the USA. An example includes data created and stored within Germany. If a copy of the data has been moved into a location, such as, for example, Germany where laws prohibit the processing of data outside of the country for certain classes of data, then the data is retained according to the more restrictive policy. Further, if data was created in a location outside of Germany and originated in another geography with lesser restrictions (e.g. USA), then the retention policy follows the more restrictive retention policy regarding both retention time and retention locations. For example, for the USA originated data, transfers of the data outside of Germany would not be allowed after processing the data within Germany, due to modification of the data within the jurisdiction of Germany.

Limitations are imposed on transferring data, according to embodiments of the present invention. For data transfer limitations, responsive to a "no transfer" governance parameter for particular data and particular geolocations, an ILG process may automatically deny permission to transfer the data from a first geolocation to a second geolocation. Responsive to a "transfer notify" governance parameter for particular data and particular geolocations, an ILG process may generate a notification in response to a transfer of the data from a first geolocation to a second geolocation. One or more examples herein below further describe data transfer limitations.

According to certain of the embodiments of the present invention, when data is copied to a new location, the ILG process marks audit table 306 for the data at the new location to indicate the change policy and transfer limits that apply for the copy of the data in the new location if the change policy and transfer limits are more restrictive at that new location. For example, if data is copied to a new country where laws prohibit transfer of the data outside of the country for the data class that applies to the data, the ILG process marks the change policy and transfer limits fields in audit table 306 for the new location of the data to indicate the data cannot be transferred from the new location after it has been changed. Thus, if Germany has a "no transfer after change" policy and the USA has a less restrictive policy, then when data created in the USA is copied to Germany, the ILG process writes entries for audit table 306 associated with the copy of the data in Germany to indicate the data cannot be transferred from the Germany storage location to a storage location outside of Germany after the German copy has been changed. Likewise, if the retention period in Germany is longer, the ILG process writes an entry for the retention field of audit table 306 of the data in Germany to follow the more stringent retention period.

For the sake of brevity, reference herein to geolocation-specific aspects of ILG technology may include jurisdiction. Likewise, reference herein to jurisdiction-specific aspects of ILG technology may include geolocation. For example, it should be understood that reference herein to associating data with a jurisdiction implies associating the data with a geolocation and vice versa, unless explicitly stated otherwise or indicated by context. According to one or more embodiments of the present invention, associating archived data with its jurisdiction(s) includes associating the geolocation of the user who initiated the archiving. It should be understood that a user who initiates archiving may be acting on behalf of (i.e., representing) a geolocation, although the user is actually located in another geolocation. Accordingly, it should be understood that descriptions herein of associating a geolocation of a user who initiated archiving may alternatively be construed as associating a geolocation represented by a user who initiated archiving.

In a case where a user's location cannot be identified, identifiable attributes will be used in classifying the data. The following are examples of identifiable information for users uploading data in various scenarios:

Anonymous user using public Internet uploading original data→(public internet IP address)

Identified user via secure login using public Internet uploading original data→(identified user home jurisdiction+public internet IP address)

Identified user via secure login using VPN uploading original data→(identified user home jurisdiction+VPN connection)

Identified user via secure login using LAN connection in physical office uploading original data→(identified user home jurisdiction+physical office location)

Data may be tagged with more than one location or jurisdiction, according to embodiments of the present invention. For example, if the data provides financial statements for colleges in the United States that must be generated to satisfy a requirement under the federal law of the United States and the federal law imposes a retention requirement for these statements, then the user may indicate "USA" as the geolocation and "USA federal" as the jurisdiction, even if the data is uploaded from an accountant's office located outside the United States. In addition, the ILG process also automatically associates the geolocation from which the data is uploaded in this example. Alternatively, or in addition, if a regulation of the U.S. Department of Commerce and another regulation of the U.S. Department of Education govern retention, the user may indicate "USA" as the geolocation and more specifically indicate "U.S. Department of Commerce" and "U.S. Department of Education" as governing jurisdictions. In a further alternative, the user may indicate specific provisions of the regulations of the U.S. Department of Commerce and specific provisions of the regulations of the U.S. Department of Education as governing jurisdictions. Also, assuming the data is a single file and there is a state law in one or more of the US states that also governs retention of college financial statements for colleges in that state, for example, then the user may also indicate each such state as a geolocation for association with the file and the jurisdiction(s) of each such state as associated jurisdiction(s). After initially archiving data, the ILG process writes a record in audit table 306 automatically in response to any access to the data, which may include a download, moving the data into another storage location, checking out the data, modifying the data, etc., wherein the record includes identification of the user who accessed the data, the user's Internet protocol address (i.e., IP address from which the user accessed the data), and reason for accessing. Historical governance parameter and data category tags for each particular data item are maintained in audit table 306 for the data even upon changes in governance and category, since current governance for the data may depend on past categories of the data. The tags are time stamped so that the ILG process may determine current governance parameters for the data based the data current and past states.

The policy table and audit table entries below illustrate examples of how an ILG process responds to permissible and impermissible data transfers governed by the policy table as shown below. The first policy table below corresponds to, but provides more details than, policy table 305 shown in FIG. 4, which has been described above.

Location Policy Table

| Location | Default Retention Period | Allow Transfers | Disallow Transfers | Sync Retention |
|---|---|---|---|---|
| A | 7 years | A, B, C | | |
| B | 10 years | A, B, C | | Yes |
| C | 7 years | C | * | |

Audit Table

| Timestamp | Data | @storage | Retention | Location Origin | Data Significance | User Identification | IP Address | Operation |
|---|---|---|---|---|---|---|---|---|
| 1 | File1.txt | B | 10 years | B | | Anonymous | 44.123.98.12 | Anonymous User uploaded File1.txt to B |
| 2 | File2.csv | A | 7 years | A | | Username1 | 123.023.44.22 | User <username> uploaded File2.csv to A |
| 3 | File3.png | C | 7 years | C | Legal Matter <123> | Anonymous | 78.123.012.13 | Anonymous User uploaded File3.png to C |
| 4 | File1.txt | A | 10 years | B | | Server A | Server A (IP Address) | Sync File1.txt to A(i.e., request from A to copy from B). Allowed due to Allow transfer listed for B. Retention period is sync'ed per origin B because "sync retention" = yes for B. |
| 5 | File1.txt | C | 10 years | B | | Server B | Server B (IP Address) | Sync File1.txt to C (i.e., request from B to copy from B). Allowed due to Allow transfer listed for B. Retention period is sync'd per origin B because "sync retention" = yes for B. |
| 6 | File3.png | | 7 years | C | Legal Matter <123> | Server A | Server A (IP Address) | Sync (i.e., request from A to copy from C) File3.png to A. Blocked due to Disallow Transfer from C listed for all locations |

-continued

| Timestamp | Data | @storage | Retention | Location Origin | Data Significance | User Identification | IP Address | Operation |
|---|---|---|---|---|---|---|---|---|
| 7 | File3.png | | 7 years | C | Legal Matter <123> | Server B | Server B (IP Address) | Sync File3.png to B (i.e., request from B to copy from C). Blocked due to Disallow Transfer from C listed for all locations |
| 8 | File2.csv | B | 7 years | A | | Server B | Server B (IP Address) | Sync File2.csv to B (i.e., request from B to copy from A). Allowed due to Allow transfer listed for A. Retention period is per location B because "sync retention" NOT = yes for A. |

Figure 5:
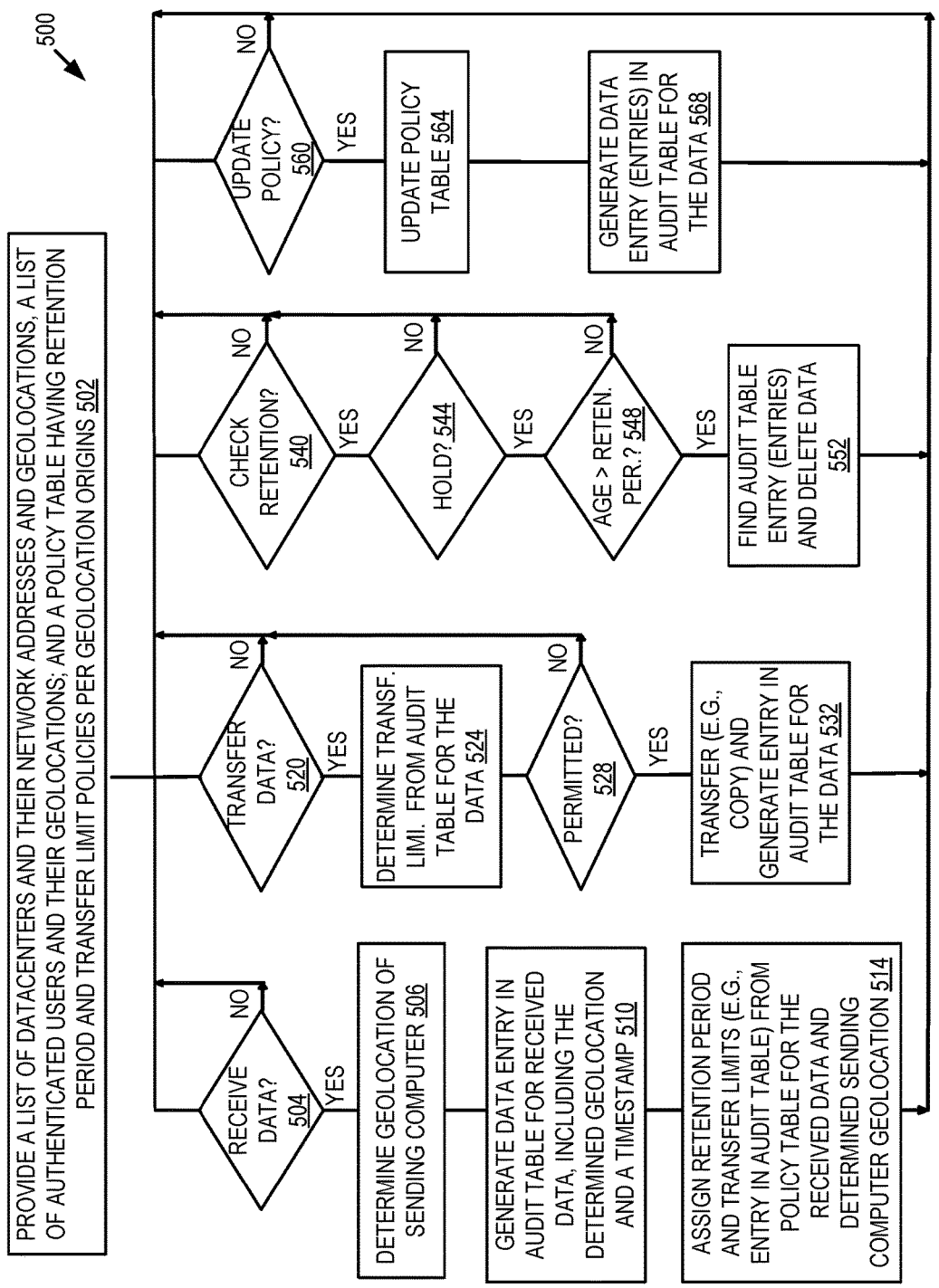
FIG. 5 illustrates, in a flow chart, actions of ILG processes, according to embodiments of the present invention.

FIG. 5 illustrates a change in the policy table above and in FIG. 4, wherein for data that originated in geolocation B, the data retention period changes from ten years to eleven years, and illustrates how the ILG process responds to the change.

Changed Location Policy Table (for Changed Retention Period of Location B)

| Location | Default Retention Period | Allow Transfers | Disallow Transfers | Sync Retention |
|---|---|---|---|---|
| A | 7 years | A, B | | |
| B | 11 years | B, C | | Yes |
| C | 7 years | C | * | |

Audit Table

| Timestamp | Data | @storage | Retention | Location Origin | Data Significance | User Identification | IP Address | Operation |
|---|---|---|---|---|---|---|---|---|
| 9 | File1.txt | B | 11 years | B | | Server B | Server B (IP Address) | Location Policy Retention Update from B (due to change in policy) |
| 10 | File1.txt | C | 11 years | B | | Server B | Server B (IP Address) | Location Policy Retention Update from B (due to change in policy) |
| 11 | File1.txt | A | 11 years | B | | Server B | Server B (IP Address) | Location Policy Retention Update from B (due to change in policy) |

The following are general remarks that follow from the disclosure herein above and that elaborate upon the above. The tables shown above are illustrative and may include more columns than shown above. For example, the audit tables show entries for retention periods. In similar fashion, entries may be included for transfer limits.

If there is a request to move or copy data from geolocation A to geolocation B, and there are no violations of the policy table, then the transfer will be successful. If there is then a request to transfer to geolocation C that data that has been moved to geolocation B, the export to C will be successful. If retention laws are changed before the transfer to C, such as in connection with the transfer from A to B, such that under the changed policy some data types from A are not allowed into C, and if the data type falls within that non-allowed type, the changed policy blocks such data from being allowed into geolocation C. (For example, if the policy table is changed to indicate that only data that does NOT have "legal" data significance is allowed in geolocation C, and if the data does not have that significance, then the changed policy blocks such data from being allowed into geolocation C.)

When the retention period for each item of data has expired, the data is deleted from its object stores, e.g., repositories, upon occurrence of a periodic sweep. If, however, the data is subject to a hold request, then the data is not deleted until the next sweep after the hold is removed, whereupon the sweep checks for all copies of the document on all repositories and deletes the expired documents.

In an example above, data was copied from geolocation B to geolocations A and C. Data that was in C was not allowed to be exported due to the data store policies. The data that was copied from B to A and C is indicated as B' in FIG. 4. The retention period for B' is the same as for B and is indicated accordingly. In the second part of an example above, the geolocation B data retention period was updated to eleven years in the policy table and entries were generated in the audit table for each of the repositories where the data resides accordingly so that data originating from geolocation B now has a retention period that is eleven years in all the data stores that contain the data.

Notice that geolocation C was not able to export any of the data originating therefrom, due to a transfer restriction for C in the policy table. In this example geolocation C is, nevertheless, allowed to accept data that originates from geolocation B, as it would be for data originating from geolocation A. And geolocation C would be allowed to export data from geolocation B to geolocation A, according to the policy table. Since the policy table for data indicates "yes" in the "Sync retention" column for B, geoeolocation C also allows propagation of the retention period for data from geolocation B, as would geolocation A. However, B and C would not allow the propagation of the retention period for data from geolocation A, since the policy table for data from A does NOT indicate "yes" in its "Sync retention" column. Consequently, data from geolocation A copied to geolocation B or geolocation C would have a retention period governed by the destination geolocation B or C, not by the origin geolocation A. These records of being moved (i.e., copied) are logged in the audit table for each piece of data, including the user that moved the data, the geography that it was stored on while moved, and the duration on the other data center (not shown in examples).

In the policy table, "C" under "Allow transfer" for geolocation B, for example, indicates that data can be transferred from geolocation B to geolocation C. "Y" under "Sync retention" for geolocation B, for example, indicates that for data originating at geolocation B and transferred (e.g., copied) from B, the retention period specified in the policy table for data originating from geolocation B applies for the copies in both geolocations. If there is no "Y" under "Sync retention" for a geolocation, such as for geolocation A in the above policy table, then for data originating at geolocation A and transferred (e.g., copied) from A to B, for example, the retention period specified in the policy table for data originating from geolocation A does NOT apply for the copy in geolocation B. Rather, the retention period specified in the policy table for geolocation B will apply for the copy of data from A that is stored in B.

Case 1: Data originally in datacenter A is later copied to datacenter C. Because of NO "sync retention" in the policy table for geolocation A, the ILG process in C does NOT retain the copy on C for the period that was originally specified for data at A. That is, the retention period from A is not updated (in the transfer) to match the copy in C. The ILG process retains the copy on C for the period specified for C, instead. Case 2: Data originally in B is later copied to C. Because of the "sync retention" property specified in the policy table for B, the ILG process on C retains the copy on C for the period that was originally specified for data at B. But note that the retention period specified in the policy table for B is greater than the retention period specified for C. When data is copied from one geolocation to another, the "sync retention" policy causes the ILG processes to determine the largest retention period that the policy table species for the two geolocations and apply the larger period to both copies of the data. In the example above, where data originally in B is later copied to C, if the retention period specified in the policy table for C were greater than the retention period specified for B, then the "sync retention" policy would cause the ILG processes to apply the larger period specified for C to both the copy of the data in C and the copy in B, even though the data originated at B. That is, for R=7 year in the policy table for B and R=10 in in the policy table for C, for example, then after transfer and sync from B to C, the retention period in both geographies B and C is updated to R=10 years for the data. Referring now to FIG. 5, a flow chart 500 is shown illustrating ILG processes, according to one or more embodiment of the present invention. For storing data in computer readable storage devices (such as first, second, and third repositories (A, B and C) hosted by computer systems control 110.3, 4 and 5 that provide ILG process described herein above), a computer readable policy table is provided 502, which is configured to define respective retention period and transfer limitation policies for respective items of the data according to geolocation origins of the respective items of the data. Also at 502, a computer readable, datacenter list is provided of network addresses and geolocations for datacenters that comply with a predetermined data security compliance standard. And an authenticated-user list is provided of authenticated users and respective geolocations associated with the respective authenticated users.

In each of the hosting computer systems, an ILG process is configured to detect that data is received from a computer system via a network, for storage on a first one of the computer readable storage devices. If no data is received, the ILG processes continue with other operations and concurrently await receipt of data. Responsive to one of the hosting computer systems determining at 504 that a request to send data (referred to as "first data") is received from a sending computer system (also referred to as a "first computer system") via a network, for storage of the data on its hosted computer readable storage device (referred to as "first computer readable storage device"), the computer system's ILG process determines at 506, as a geolocation origin of the first data, a geolocation of the computer system from which the first data is received (referred to as "first computer system").

In an illustrative instance, the first computer system, i.e., the computer system from which the request and data are received at 504, is located in a first datacenter that complies with the predetermined data security compliance standard, and determining the geolocation of the first computer system at 506 includes matching, by the ILG process on the host computer receiving the data, the network by which the first data is received from the first computer system with a network on the datacenter list.

Also in an illustrative instance, the first computer system from which the request and data are received at 504 is a computer system of a first authenticated user. Further, the determining of the geolocation of the first computer system at 506 includes the ILG process matching the first authenticated user with one of the authenticated users on the authenticated-user list.

At 510, the ILG process generates a first data entry for the first data in a computer readable audit table responsive to receiving the first data for storage on the first computer readable storage device. This includes generating, for the first data entry, a timestamp indicating when the first data was received and the geolocation of the first computer system from which the first data is received, which may be determined in various ways as described herein above.

At 514, the ILG process of the receiving computer system that hosts the first storage device assigns an applicable retention period and transfer limits for the first data by the ILG process executing on the host computer system and stores the data. The retention period assigned is a retention period indicated in the policy table for the geolocation origin indicated in the first data entry. Likewise, the transfer limits assigned are those indicated in the policy table for the geolocation origin indicated in the first data entry. In one embodiment, the assigning includes writing the retention period and transfer limits from the policy table for the first data in the first data entry.

At 540, the ILG process detects that a period since a last sweep has elapsed, or else that an event triggering a sweep has occurred, and the process initiates a sweep to determine a current age of the first data, which is based on the timestamp of the first data entry. Responsive to determining at 544 that there is no hold on deleting the first data, and responsive to determining at 548 that the current age of the first data exceeds the applicable retention period assigned to the first data, the ILG process deletes 552 the first data from the storage on the first computer readable storage device. In an embodiment, the applicable retention period assigned to the first data is based on a most recent data entry for the first data in the computer readable audit table. So determining the applicable retention period assigned to the first data may include the ILG process scanning audit table entries to find entries for the first data and finding in those entries the most recent entry for each storage device with a copy of the data.

At 560, responsive to detecting that there is a request to change the policy table for the first data, such as a change in retention period or transfer limit, the ILG process receives the change and writes it to the policy table at 564. Then the ILG process writes one or more audit table entries for the change at 568, i.e., a new entry for each copy of the data that exists in the ILG process controlled storage devices.

The ILG process at the computer hosting the first computer readable storage devices receives at 520 a request to copy the first data from the first computer readable storage device to a second one of the computer readable storage devices. The ILG process determines at 524 the transfer limits and retention period for the first data, based on the latest audit table entry for the host, which were previously determined from the policy table for the data and selects at 528 whether to copy the first data from the first computer readable storage device to the second one of the computer readable storage devices responsive to the applicable transfer limitation for the first data in the first data entry. If permitted, the ILG process copies the data at 532.

It should be appreciated from the forgoing that embodiments of the present invention provide scalable technology that permits a growing enterprise to fully respond to changes in retention requirements. Embodiments of the present invention allow multisite document distribution to automatically update retention policy depending on where a document is used, allows compliance with local retention laws, propagates updated information backwards to other copies of the data and defines export and import rules for managing retention policies for different physical sites.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention. It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for storing data in computer readable storage devices, the method comprising:

providing a computer readable policy table and a computer readable audit table;

providing sets of policy entries in the policy table for respective geolocations, where the set of policy entries for each respective one of the geolocations includes a retention period policy entry that specifies a retention period for data items originating from the respective one of the geolocations and a synchronize policy entry indicating whether a binary synch/not synch state is set to the synch state, where the synch/not synch state specifies what retention period governs the data items originating from the respective one of the geolocations when the data items originating from the respective one of the geolocations are stored in the other ones of the geolocations;

receiving first data from a first computer system via a network and storing the first data on a first computer readable storage device;

generating, for the received first data, a first set of audit data entries in the audit table by an information lifecycle governance ("ILG") process executing on a host computer system, including:
 an identification entry indicating an identity of the first data,
 a timestamp entry indicating when the first data was received,
 an origin geolocation entry indicating, as an origin geolocation of the first data, a geolocation of the first computer system from which the first data is received,
 a storage geolocation entry indicating a geolocation of the first computer readable storage device, and
 a retention period entry for the first data, where the ILG process generates the retention period entry in the first set of audit data entries in response to looking up the retention period policy entry in the policy table that corresponds to the origin geolocation entry in the first set of audit data entries;

generating, by the ILG process in response to copying the first data to a second computer readable storage device located at a different geolocation than the geolocation of the first computer readable storage device, a second set of audit data entries in the audit table, including:
 an identification entry indicating the identity of the first data,
 a timestamp entry indicating when the copy of the first data was received,
 an origin geolocation entry indicating the origin geolocation of the first data,
 a storage geolocation entry indicating the geolocation of the second computer readable storage device, and
 a retention period entry for the copy of the first data on the second storage device, where the ILG process generates the retention period entry for the second set of audit data entries based on the origin geolocation of the first data when the synchronize policy entry in the set of policy table entries for the origin geolocation of the first data indicates a synch state and based on the geolocation of the second computer readable storage device when the synchronize policy entry in the set of policy table entries for the origin geolocation of the first data indicates a not synch state;

causing, by the ILG process, deletion of the first data on the first computer readable storage device based on an age indicated by the retention period entry of the first set of audit data entries; and causing, by the ILG process, deletion of the copy of the first data on the second computer readable storage device based on an age indicated by the retention period entry of the second set of audit data entries.

2. The method of claim 1, comprising:
providing a datacenter list of network addresses and geolocations for datacenters that comply with a predetermined data security compliance standard, wherein the first computer system is located in a first one of the datacenters, and wherein the method comprises:
 determining the geolocation of the first computer system by the ILG process matching a network by which the first data is received with a network on the datacenter list.

3. The method of claim 2, comprising:
providing an authenticated-user list including respective geolocations associated with respective authenticated users, wherein receiving the first data comprises:
 receiving the first data from a first one of the authenticated users, and wherein the determining of the geolocation of the first computer system comprises:
  matching, by the ILG process, the first authenticated user with one of the authenticated users on the authenticated-user list.

4. The method of claim 1, wherein providing the computer readable policy table comprises:
providing the computer readable policy table configured to also define respective transfer limitation policies for respective items of the data according to geolocation origins of the respective items of the data, and wherein the method further comprises:
 determining a transfer limitation for the first data stored on the first computer readable storage device, where by the ILG process determines the transfer limitation responsive to a transfer limitation entry in the policy table for the geolocation origin in the first set of data entries.

5. The method of claim 4, comprising:
receiving a request to copy the first data from the first computer readable storage device to the second computer readable storage device;
selecting whether to copy the first data responsive to the applicable transfer limitation for the first data in the first set of data entries.

6. A system for storing data in a computer readable storage device comprising:
a processor; and
a computer readable storage medium connected to the processor, wherein the computer readable storage medium has stored thereon a program for controlling the processor, and wherein the processor is operative with the program to execute the program for:
 providing a computer readable policy table and a computer readable audit table;
 providing sets of policy entries in the policy table for respective geolocations, where the set of policy entries for each respective one of the geolocations includes a retention period policy entry that specifies a retention period for data items originating from the respective one of the geolocations and a synchronize policy entry indicating whether a binary synch/not synch state is set to the synch state, where the synch/not synch state specifies what retention period governs the data items originating from the respective one of the geolocations when the data items originating from the respective one of the geolocations are stored in the other ones of the geolocations;

receiving first data from a first computer system via a network and storing the first data on a first computer readable storage device;

generating, for the received first data, a first set of audit data entries in the audit table by an information lifecycle governance ("ILG") process executing on a host computer system, including:

an identification entry indicating an identity of the first data, a timestamp entry indicating when the first data was received, an origin geolocation entry indicating, as an origin geolocation of the first data, a geolocation of the first computer system from which the first data is received, a storage geolocation entry indicating a geolocation of the first computer readable storage device, and a retention period entry for the first data, where the ILG process generates the retention period entry in the first set of audit data entries in response to looking up the retention period policy entry in the policy table that corresponds to the origin geolocation entry in the first set of audit data entries;

generating, by the ILG process in response to copying the first data to a second computer readable storage device located at a different geolocation than the geolocation of the first computer readable storage device, a second set of audit data entries in the audit table, including:

an identification entry indicating the identity of the first data, a timestamp entry indicating when the copy of the first data was received, an origin geolocation entry indicating the origin geolocation of the first data, a storage geolocation entry indicating the geolocation of the second computer readable storage device, and a retention period entry for the copy of the first data on the second storage device, where the ILG process generates the retention period entry for the second set of audit data entries based on the origin geolocation of the first data when the synchronize policy entry in the set of policy table entries for the origin geolocation of the first data indicates a synch state and based on the geolocation of the second computer readable storage device when the synchronize policy entry in the set of policy table entries for the origin geolocation of the first data indicates a not synch state;

causing, by the ILG process, deletion of the first data on the first computer readable storage device based on an age indicated by the retention period entry of the first set of audit data entries; and causing, by the ILG process, deletion of the copy of the first data on the second computer readable storage device based on an age indicated by the retention period entry of the second set of audit data entries.

7. The system of claim 6, wherein the processor is operative with the program to execute the program for:

providing a datacenter list of network addresses and geolocations for datacenters that comply with a predetermined data security compliance standard, wherein the first computer system is located in a first one of the datacenters, and wherein the method comprises:

determining the geolocation of the first computer system by the ILG process matching a network by which the first data is received with a network on the datacenter list.

8. The system of claim 7, wherein the processor is operative with the program to execute the program for:

providing an authenticated-user list including respective geolocations associated with respective authenticated users, wherein receiving the first data comprises:

receiving the first data from a first one of the authenticated users, and wherein the determining of the geolocation of the first computer system comprises:

matching, by the ILG process, the first authenticated user with one of the authenticated users on the authenticated-user list.

9. The system of claim 6, wherein providing the computer readable policy table comprises:

providing the computer readable policy table configured to also define respective transfer limitation policies for respective items of the data according to geolocation origins of the respective items of the data, and wherein the method further comprises:

determining a transfer limitation for the first data stored on the first computer readable storage device, where by the ILG process determines the transfer limitation responsive to a transfer limitation entry in the policy table for the geolocation origin in the first set of data entries.

10. The system of claim 9, wherein the processor is operative with the program to execute the program for:

receiving a request to copy the first data from the first one computer readable storage device to the second computer readable storage device;

selecting whether to copy the first data responsive to the applicable transfer limitation for the first data in the first set of data entries.

11. A computer program product for storing data in a computer readable storage device, including a computer readable storage medium having instructions stored thereon for execution by a computer system, wherein the instructions, when executed by the computer system, cause the computer system to implement a method comprising:

providing a computer readable policy table and a computer readable audit table;

providing sets of policy entries in the policy table for respective geolocations, where the set of policy entries for each respective one of the geolocations includes a retention period policy entry that specifies a retention period for data items originating from the respective one of the geolocations and a synchronize policy entry indicating whether a binary synch/not synch state is set to the synch state, where the synch/not synch state specifies what retention period governs the data items originating from the respective one of the geolocations when the data items originating from the respective one of the geolocations are stored in the other ones of the geolocations;

receiving first data from a first computer system via a network and storing the first data on a first computer readable storage device;

generating, for the received first data, a first set of audit data entries in the audit table by an information lifecycle governance ("ILG") process executing on a host computer system, including:

an identification entry indicating an identity of the first data, a timestamp entry indicating when the first data was received, an origin geolocation entry indicating, as an origin geolocation of the first data, a geolocation of the first computer system from which the first data is received,
a storage geolocation entry indicating a geolocation of the first computer readable storage device, and
a retention period entry for the first data, where the ILG process generates the retention period entry in the first set of audit data entries in response to looking up the retention period policy entry in the policy table that corresponds to the origin geolocation entry in the first set of audit data entries;
generating, by the ILG process in response to copying the first data to a second computer readable storage device located at a different geolocation than the geolocation of the first computer readable storage device, a second set of audit data entries in the audit table, including:
an identification entry indicating the identity of the first data,
a timestamp entry indicating when the copy of the first data was received,
an origin geolocation entry indicating the origin geolocation of the first data,
a storage geolocation entry indicating the geolocation of the second computer readable storage device, and
a retention period entry for the copy of the first data on the second storage device, where the ILG process generates the retention period entry for the second set of audit data entries based on the origin geolocation of the first data when the synchronize policy entry in the set of policy table entries for the origin geolocation of the first data indicates a synch state and based on the geolocation of the second computer readable storage device when the synchronize policy entry in the set of policy table entries for the origin geolocation of the first data indicates a not synch state;
causing, by the ILG process, deletion of the first data on the first computer readable storage device based on an age indicated by the retention period entry of the first set of audit data entries; and
causing, by the ILG process, deletion of the copy of the first data on the second computer readable storage device based on an age indicated by the retention period entry of the second set of audit data entries.

12. The computer program product of claim 11, wherein the instructions, when executed by the computer system, cause the computer system to implement a method comprising:
providing a datacenter list of network addresses and geolocations for datacenters that comply with a predetermined data security compliance standard, wherein the first computer system is located in a first one of the datacenters, and wherein the method comprises:
determining the geolocation of the first computer system by the ILG process matching a network by which the first data is received with a network on the datacenter list.

13. The computer program product of claim 12, wherein the instructions, when executed by the computer system, cause the computer system to implement a method comprising:
providing an authenticated-user list including respective geolocations associated with respective authenticated users, wherein receiving the first data comprises:
receiving the first data from a first one of the authenticated users, and wherein the determining of the geolocation of the first computer system comprises:
matching, by the ILG process, the first authenticated user with one of the authenticated users on the authenticated-user list.

14. The computer program product of claim 11, wherein providing the computer readable policy table comprises:
providing the computer readable policy table configured to also define respective transfer limitation policies for respective items of the data according to geolocation origins of the respective items of the data, and wherein the method further comprises:
determining a transfer limitation for the first data stored on the first computer readable storage device, where by the ILG process determines the transfer limitation responsive to a transfer limitation entry in the policy table for the geolocation origin in the first set of data entries.

15. The computer program product of claim 14, wherein the instructions, when executed by the computer system, cause the computer system to implement a method comprising:
receiving a request to copy the first data from the first one computer readable storage device to the second computer readable storage device;
selecting whether to copy the first data responsive to the applicable transfer limitation for the first data in the first set of data entries.

* * * * *